（12）United States Patent
Cathcart et al.

(10) Patent No.: US 10,717,541 B2
(45) Date of Patent: Jul. 21, 2020

(54) UAV FUEL AND LUBRICATION SYSTEM (71) Applicant: ORBITAL AUSTRALIA PTY LTD, Balcatta, Western Australia (AU)

(72) Inventors: Geoffrey Paul Cathcart, Mount Lawley (AU); Stephen John Karay, Scarborough (AU); Nicholas Coplin, Merriwa (AU); John Howard Tubb, Befordale (AU); Callan Murray Bleechmore, Beaconsfield (AU); Donald Andrew Railton, Duncraig (AU); Mario Charles Muscat, Ballajura (AU)

(73) Assignee: ORBITAL AUSTRALIA PTY LTD, Balcatta, Western Australia (AU)

( * ) Notice: Subject to any disclaimer, the term of this patent is extended or adjusted under 35 U.S.C. 154(b) by 23 days.

(21) Appl. No.: 15/551,740

(22) PCT Filed: Feb. 19, 2016

(86) PCT No.: PCT/AU2016/000054
§ 371 (c)(1),
(2) Date: Aug. 17, 2017

(87) PCT Pub. No.: WO2016/131088
PCT Pub. Date: Aug. 25, 2016

(65) Prior Publication Data
US 2018/0057185 A1    Mar. 1, 2018

(30) Foreign Application Priority Data
Feb. 19, 2015 (AU) ................................ 2015900579

(51) Int. Cl.
*F01M 1/02*    (2006.01)
*F02M 37/00*    (2006.01)
(Continued)

(52) U.S. Cl.
CPC .............. *B64D 37/08* (2013.01); *B60K 15/03* (2013.01); *B64C 39/024* (2013.01); *B64D 37/02* (2013.01);
(Continued)

(58) Field of Classification Search
CPC .... B64D 37/08; B64D 37/02; F02M 37/0088; F02M 37/025; F04B 17/04;
(Continued)

(56) References Cited

U.S. PATENT DOCUMENTS 3,168,904 A    2/1965  Conover
4,142,486 A *  3/1979  Schreier ................... F01M 3/00
                                                    123/196 R
(Continued)

FOREIGN PATENT DOCUMENTS

CN    201350974 Y    11/2009
CN    103303474 A    9/2013
(Continued)

OTHER PUBLICATIONS

International Search Report and Written Opinion of the ISA for PCT/AU2016/000054, ISA/AU, Woden ACT, dated Apr. 22, 2016.
(Continued)

*Primary Examiner* — Thomas N Moulis
(74) *Attorney, Agent, or Firm* — Harness, Dickey & Pierce, P.L.C.

(57) ABSTRACT

An unmanned aerial vehicle has an internal combustion engine, and a fuel and lubrication system comprising a fuelling system for fuelling the engine and a lubrication system for delivering lubricating oil to the engine. The fuelling system comprises a fuel reservoir from which fuel can be delivered to the engine. The fuel reservoir comprises a main tank and a header tank. The lubrication system comprises an oil tank. The oil tank is accommodated inter-
(Continued)

nally within the main tank to provide an integrated assembly. The arrangement provides for warming of lubrication oil for the UAV engine using several available heat sources. Further, the arrangement facilitates a configuration and layout intended to minimise or negate any undesirable moments of inertia for the UAV during flight as fuel and oil is consumed.

20 Claims, 3 Drawing Sheets (51) Int. Cl.
*B64D 37/08* (2006.01)
*F01M 5/00* (2006.01)
*B64D 37/02* (2006.01)
*B60K 15/03* (2006.01)
*B64C 39/02* (2006.01)
*F02M 37/02* (2006.01)
*F04B 17/04* (2006.01)

(52) U.S. Cl.
CPC .............. *F01M 1/02* (2013.01); *F01M 5/001* (2013.01); *F02M 37/0088* (2013.01); *F02M 37/025* (2013.01); *F04B 17/04* (2013.01); B60K 2015/0325 (2013.01); B60K 2015/03105 (2013.01); B60K 2015/03111 (2013.01); B60K 2015/03217 (2013.01); B60K 2015/03236 (2013.01); B60K 2015/03243 (2013.01); B60Y 2200/51 (2013.01); B64C 2201/044 (2013.01); F01M 2001/0223 (2013.01)

(58) Field of Classification Search
CPC .. B64C 39/024; B64C 2201/044; F01M 1/02; F01M 5/001; F01M 2001/0223; B60K 15/03; B60K 2015/03236; B60K 2015/03105; B60K 2015/03217; B60K 2015/03243; B60K 2015/0325; B60K 2015/03111; B60Y 2200/51
See application file for complete search history.

(56) References Cited

U.S. PATENT DOCUMENTS

| | | | | |
|---|---|---|---|---|
| 4,262,710 A * | 4/1981 | Nomura | ................ | B62M 23/00 123/73 AD |
| 4,546,750 A * | 10/1985 | Brunell | ................ | B60K 15/077 123/514 |
| 4,552,282 A * | 11/1985 | Nishida | .............. | B60K 15/0406 220/23.2 |
| 4,590,798 A * | 5/1986 | Yazaki | ................... | F01M 11/12 116/227 |
| 4,594,970 A * | 6/1986 | Baars | ..................... | B60K 15/00 123/73 AD |
| 4,617,879 A * | 10/1986 | Mori | ........................ | F01M 3/02 123/73 AD |
| 4,819,833 A * | 4/1989 | Huddleston | ............ | B65D 25/56 137/576 |
| 4,869,225 A * | 9/1989 | Nagata | .................. | F02M 37/106 123/509 |
| 5,050,567 A * | 9/1991 | Suzuki | ................. | F02M 37/106 123/497 |
| D333,177 S * | 2/1993 | Poirier | ...................... | D23/211.1 |
| 5,263,458 A * | 11/1993 | Fujino | .................. | B60K 15/077 123/514 |
| 5,396,872 A * | 3/1995 | Ruger | .................. | B60K 15/077 123/514 |
| 5,879,211 A * | 3/1999 | Koyanagi | ............ | B63H 21/213 440/89 H |
| 6,283,731 B1* | 9/2001 | Yoshioka | ........... | B01D 35/0273 417/423.3 |
| 6,302,078 B1* | 10/2001 | Singer | .................... | F01M 11/10 123/196 R |
| 6,371,153 B1* | 4/2002 | Fischerkeller | ......... | B60K 15/00 123/509 |
| 9,108,765 B1* | 8/2015 | Danner | .................... | B67D 7/84 |
| 9,527,650 B2* | 12/2016 | Jordan | ............... | B65D 21/0204 |
| 2009/0314783 A1 | 12/2009 | Losinski et al. | | |
| 2010/0116361 A1* | 5/2010 | Furuhashi | ............ | B60K 15/077 137/398 |
| 2011/0272414 A1* | 11/2011 | Gaden | .................... | B60K 13/04 220/564 |
| 2015/0152757 A1* | 6/2015 | Barber | ..................... | F01M 1/02 123/304 |

FOREIGN PATENT DOCUMENTS

| | | |
|---|---|---|
| DE | 19800788 A1 | 7/1999 |
| DE | 102013022081 A1 | 7/2014 |
| JP | S-5871219 A | 4/1983 |
| KR | 20110042955 A | 4/2011 |
| WO | WO-2009/078757 A1 | 6/2009 |
| WO | WO-2014/016710 A1 | 1/2014 |

OTHER PUBLICATIONS

International Preliminary Report on Patentability (Ch. II) for PCT/AU2016/000054, IPEA/AU, Woden ACT, dated Feb. 16, 2017.
International Search Report and Written Opinion for EP 16751811 dated Oct. 24, 2018.
Chinese Office Action from Application No. 2016800133496 dated Sep. 27, 2019.

* cited by examiner

UAV FUEL AND LUBRICATION SYSTEM

CROSS-REFERENCE TO RELATED APPLICATIONS

This application is a 371 U.S. National Stage of International Application No. PCT/AU2016/000054, filed Feb. 19, 2016, which claims the benefit of and priority to Australian Patent Application No. 2015900579, filed Feb. 19, 2015. The disclosures of the above applications are incorporated herein by reference.

TECHNICAL FIELD

The present invention relates to a fuel and lubrication system for an internal combustion engine.

The invention also relates to an engine system for a vehicle, as well as a vehicle having such an engine system.

The present invention has been devised particularly, although not necessarily solely, in relation to a fuel and lubrication system for a two-stroke internal combustion engine. However, it should be understood that the invention may have application to other internal combustion engines, including in particular four-stroke engines and rotary (Wankel) engines.

Furthermore, the invention has been devised particularly, although not necessarily solely, for use with an engine of an unmanned aerial vehicle (UAV).

BACKGROUND ART

The following discussion of the background art is intended to facilitate an understanding of the present invention only. The discussion is not an acknowledgement or admission that any of the material referred to is or was part of the common general knowledge as at the priority date of the application.

As mentioned above, the invention is particularly applicable to an unmanned aerial vehicle (UAV). Accordingly, the invention will primarily be discussed in relation to that application. However, it should be understood that the invention may have application to various other vehicles, machines, apparatus and devices having internal combustion engines which require fuel and lubrication.

Operation of a UAV on missions likely to encounter high altitude conditions or likely to involve prolonged operation in cold environments can present challenges in relation to oil lubrication requirements for an internal combustion engine powering the UAV. This can be particularly so in circumstances where extremely low ambient air temperatures are experienced (say, for example, temperatures in the order of 30° C. below freezing). In such low temperature conditions, it can be difficult to adequately and reliably pump lubrication oil, which is likely to have a very high viscosity owing to the extremely low temperature, in sufficient quantities to satisfy the lubrication requirements of the engine.

Accordingly, there is a need to heat (warm) the lubrication oil to facilitate pumping of the oil in an effective and robust manner.

For this purpose, it may be advantageous to provide an unmanned aerial vehicle (UAV) with the capacity to heat (warm) lubrication oil for the UAV engine relatively rapidly using heat sources onboard the UAV.

In the design of a UAV, the position of the centre of gravity and moments of inertia can also be very important in relation to the stability and performance of the UAV in flight. In this regard, an important consideration is the configuration and layout of the engine system for propulsion of the UAV, particularly for a UAV having an engine system incorporating an internal combustion engine.

Distribution of mass within a UAV is very important, and mass of onboard fuel contributes to the total mass of the UAV. Fuel consumption throughout a flight leads to progressive changes in the mass of the onboard fuel and so affects the total mass of the UAV. In view of this, it is common design practice to locate a fuel tank at or close to the centre of gravity such that any variation in the fuel mass does not cause a significant shift in the position of the centre of gravity and hence affect moments of inertia for the UAV.

In the design of a UAV, regard must also be had to lubrication requirements of a UAV internal combustion engine. With certain fuelling systems for two-stroke internal combustion engines, the lubrication oil is supplied with the fuel, the lubrication oil being mixed with the fuel to provide what is known as a "pre-mix". With this arrangement, the fuel tank is filled with the pre-mixed oil and fuel, and accordingly there is only one liquid volume (being the pre-mix within the fuel tank) that needs to be accounted for in the design process.

However, not all fuelling systems can operate effectively using pre-mixed oil and fuel, and in certain cases it is common to deliver lubrication oil to the engine separately of the fuel. This is typically done by way of an engine lubrication system comprising an oil tank and an oil pump for delivering oil from the oil tank to the engine. While this can be effective in satisfying lubrication requirements for the engine, it does introduce additional mass factors into UAV design considerations, and in particular it introduces another liquid volume (being oil within the oil tank) that needs to be accounted for in the design. As with fuel, the lubrication oil is typically consumed during flight and so regard must be had to the progressively varying mass within the oil tank.

A UAV may need to accommodate not only the engine system, but also avionics and often payloads. Where there are size constraints for a UAV, there can be challenges in accommodating these various requirements, particularly in a configuration and layout which is required to satisfy design considerations with respect to the centre of gravity and moments of inertia for the UAV.

Accordingly, it may be advantageous for there to be some integration of the fuel system and the oil lubrication system to provide a compact arrangement which assists is satisfying design considerations.

It is against this background that the present invention has been developed.

SUMMARY OF INVENTION

According to a first aspect of the invention there is provided a fuel and lubrication system comprising a fuel reservoir and an oil reservoir, wherein the oil reservoir is integrated with the fuel reservoir, and wherein the fuel reservoir comprises a main tank and a supplementary tank which can receive fuel from the main tank and from which fuel can be delivered to an engine.

In being integrated with the fuel reservoir, the oil reservoir may be accommodated within the fuel reservoir or may be located closely adjacent the fuel reservoir. It is, however, preferable that the oil reservoir be accommodated internally within the fuel reservoir. More particularly, it is preferable that the oil reservoir be accommodated internally within the main tank of the fuel reservoir.

With this arrangement, thermal energy (heat) within fuel contained within the main fuel tank may be transferred to the oil tank for heating (warming) of the oil.

The supplementary tank may be associated with the main tank, whereby the main tank and the supplementary tank cooperate to provide the fuel reservoir. In a preferred arrangement, such an association is by way of the supplementary tank being accommodated within or closely adjacent to the main tank. It is, however, preferable that the supplementary tank be accommodated internally within the main tank.

A transfer system may be provided for transferring fuel within the fuel reservoir from the main tank to the supplementary tank. The transfer system may comprise a transfer pump. The transfer pump may comprise a jet pump supplied by return fuel flow from the engine to the fuel reservoir.

The oil reservoir may comprise an oil tank accommodated internally within the main tank of the fuel reservoir.

With this arrangement, the oil tank is integrated with the fuel reservoir, thereby providing a compact configuration. A compact configuration may be beneficial in assisting in the design process of a UAV having size constraints, particularly in achieving a configuration and layout which also satisfies considerations with respect to the centre of gravity and moments of inertia of the UAV.

The fuel and lubrication system may further comprise an oil pump for delivery of oil from the oil tank to the engine.

The oil pump may be accommodated within the oil tank.

The oil pump may comprise an electronic oil pump. However, this need not necessarily be the case as other pumping arrangements may be possible, including for example a mechanical pumping arrangement.

The electronic oil pump may comprise an electromagnetically-actuated pump. The electromagnetically-actuated pump may comprise an electromagnetically-actuated reciprocating-piston pump. The electromagnetically-actuated reciprocating-piston pump may comprise a solenoid actuated positive displacement pump.

With this arrangement, operation of the electronic oil pump may generate additional heat to assist heating (warming) of oil within the oil tank. This would also likely be the case if other pumping arrangements were implemented; for example, a mechanical pump would likely also generate some heat through friction during operation.

As alluded to above, there are several sources of heat for heating (warming) the lubricating oil, including heat transfer from the fuel and also heat available from operation of the electronic oil pump. Heating of the lubrication oil may be beneficial in certain circumstances; for example, at start-up, and also for a UAV engine likely to experience high altitude operating conditions or prolonged operation in cold environments.

In relation to heat transfer from the fuel, the fuel may accumulate heat from various sources, including for example heat generated by operation of a fuel pump to which the fuel is exposed, and heat from the internal combustion engine itself. Heat from the internal combustion engine may be by way of conduction and/or heat transfer through circulation of fuel between the fuel reservoir and the engine (in circumstances where the fuel delivery system includes a recirculation circuit for returning excess fuel to the fuel reservoir).

In relation to heat transfer from the electronic oil pump, heat may be generated in several ways through operation of the electronic oil pump.

Firstly, the mere operation of the electronic oil pump will likely generate heat. By way of example, in the case where the electronic oil pump comprises an electromagnetically-actuated piston pump, there may be an electromagnetic coil adapted to be energised by an electrical supply, with energisation of the coil generating heat. Additionally, heat will also likely be generated through frictional effects upon movement of the piston within the pump.

Secondly, the electronic oil pump may be operated according to a predefined control strategy to provide additional heat. By way of example, in the case where the electronic oil pump comprises an electromagnetically-actuated piston pump, over-energisation of the coil can be used to heat the pump and consequently oil surrounding the pump. In other words, the electromagnetic coil can be energised for a time period longer than the stroke period of the pump, whereby the additional energy, which cannot induce further movement of the piston because the piston is at the end of its stroke, is dissipated as heat. Put another way, the electromagnetic coil may be energized for a period of time to cause heating of the oil without the pump continuously pumping the oil. In this way, the electronic oil pump is operable to generate additional heat to assist heating (warming) of oil without pumping of any additional oil.

The electronic oil pump may be controlled by a controller, such as for example an engine control unit (ECU) for the UAV engine. The controller may be operable to vary the energisation period of the electromagnetic coil to affect a lubrication oil heating strategy.

According to a second aspect of the invention there is provided a vehicle having a fuel and lubrication system according to the first aspect of the invention.

The vehicle may have an internal combustion engine operable using fuel and lubricating oil received from the fuel and lubrication system.

The internal combustion engine may comprise a two-stroke engine utilising direct fuel injection. The direct fuel injection may be achieved in any appropriate way, including by way of a dual fluid (air-assist) injection system.

The vehicle may be of any appropriate type, including for example an unmanned aerial vehicle (UAV), another type of aerial vehicle or aerial craft, a watercraft, or a ground-based vehicle including for example a snowmobile.

According to a third aspect of the invention there is provided a vehicle engine system comprising an internal combustion engine, a fuel system for fuelling the engine, and a lubrication system for delivering lubrication oil to the engine, the fuel system comprising a fuel reservoir, the lubrication system comprising an oil reservoir, wherein the oil reservoir is integrated with the fuel reservoir, and wherein the fuel reservoir comprises a main tank and a supplementary tank which can receive fuel from the main tank and from which fuel can be delivered to the engine.

The oil reservoir may be accommodated internally within the fuel reservoir.

The lubrication system may further comprise an oil pump, the oil pump comprising an electronic oil pump accommodated within the oil tank.

The fuel reservoir featured in the vehicle engine system according to this third aspect of the invention may have any one or more of the features referred to above in relation to the fuel reservoir featured in the fuel and lubrication system according to the first aspect of the invention.

The oil pump featured in the vehicle engine system according to this third aspect of the invention may have any one or more of the features referred to above in relation to the oil pump featured in the fuel and lubrication system according to the first aspect of the invention.

According to a fourth aspect of the invention there is provided a vehicle having a vehicle engine system according to the third aspect of the invention.

As mentioned above, the vehicle may be of any appropriate type, including for example an unmanned aerial vehicle (UAV), another type of aerial vehicle or aerial craft, a watercraft, or a ground-based vehicle including for example a snowmobile.

According to a fifth aspect of the invention there is provided an unmanned aerial vehicle (UAV) comprising:
an airframe; and
a propulsion system including an internal combustion engine, a fuel reservoir from which fuel can be delivered to the engine, and an oil reservoir from which lubricating oil can be delivered to the engine;
wherein the oil reservoir is accommodated internally within the fuel reservoir to provide an integrated assembly; and
wherein the fuel reservoir comprises a main tank and a supplementary tank which can receive fuel from the main tank and from which fuel can be delivered to an engine.

The integrated assembly is preferably so positioned within the airframe with respect to the centre of gravity of the UAV such that variations in fuel mass within the fuel reservoir and oil mass within the oil reservoir do not cause a significant shift in the position of the centre of gravity, hence avoiding generation of unwanted moments of inertia for the UAV during flight.

Preferably the airframe includes a fuselage, in which case the integrated assembly may be so positioned in the manner described within the fuselage.

It should be noted, however, that certain unmanned aerial vehicles may not have a distinct fuselage, in which case the integrated assembly may be so positioned in the manner described within an appropriate part of the airframe. By way of example, with such a UAV the airframe may essentially comprise a pair of "flying wings", in which case the integrated assembly may be so positioned in the manner described within the "flying wings".

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which.

In the drawings, like structures are referred to by like numerals throughout the various views. The drawings shown are not necessarily to scale, with emphasis instead generally being placed upon illustrating the principles of the present invention.

The figures depict a particular embodiment of the invention. The embodiment illustrates a certain configuration; however, it is to be appreciated that the invention can take the form of many configurations, as would be obvious to a person skilled in the art, while still embodying the present invention. These configurations are to be considered within the scope of the invention.

DESCRIPTION OF EMBODIMENTS

Figure 1:
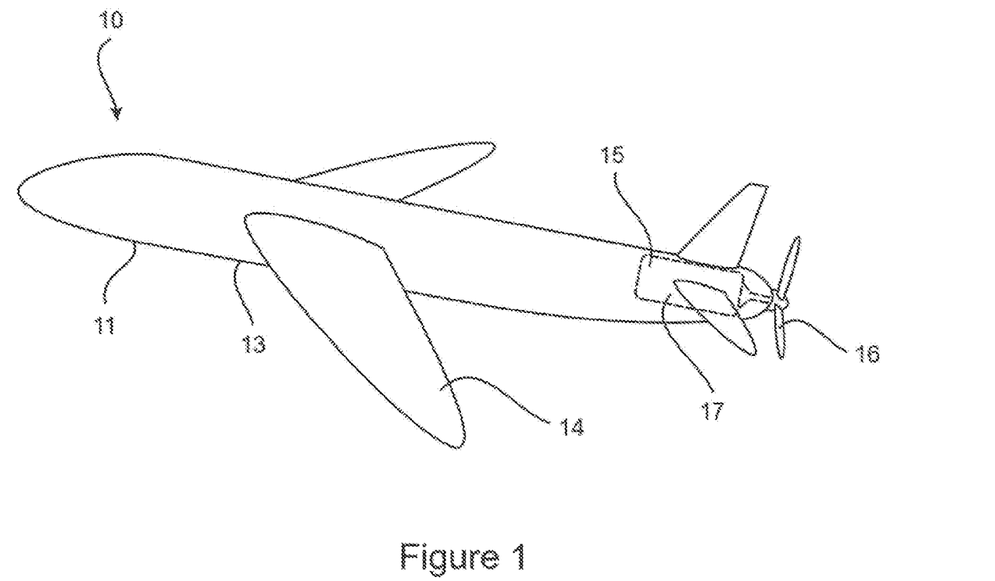
FIG. 1 is a schematic perspective view of an unmanned aerial vehicle (UAV) having a propulsion system featuring an internal combustion engine and a fuel and lubrication system, according to the invention.

Referring to FIG. 1, there is shown an example embodiment of an unmanned aerial vehicle (UAV) depicted generally by reference numeral 10. The example embodiment UAV 10 comprises an airframe 11 including a fuselage 13 and wings 14. The example embodiment UAV 10 further comprises a propulsion system 15 comprising a propeller 16 and a propulsion module 17 for driving the propeller. In the arrangement shown, the propeller 16 is configured as a pusher propeller, but it need not necessarily be so. By way of example, in other arrangements the propeller 16 may be configured as a tractor propeller.

Figure 2:
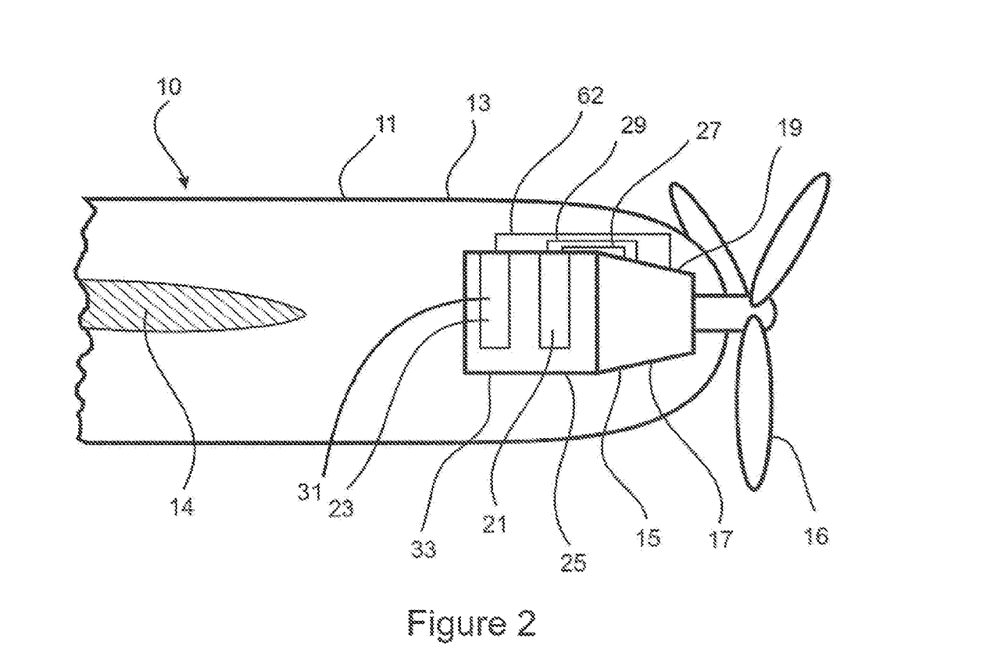
FIG. 2 is a schematic fragmentary side view, illustrating in particular the propulsion system.

As best seen in FIG. 2, the propulsion module 17 includes an internal combustion engine 19, and a fuel and lubrication system comprising a fuelling system 21 for fuelling the engine and a lubrication system 23 for delivering lubricating oil to the engine. An engine control unit (ECU) is provided for controlling operation of the engine 19 in known manner, as well as operation of the fuelling system 21 and the lubrication system 23.

The fuelling system 21 comprises a fuel reservoir 25 from which fuel can be delivered to the engine, a fuel supply circuit 27 for transporting fuel from the fuel reservoir 25 to the engine, and a fuel return circuit 29 for returning excess fuel to the engine to the fuel reservoir 25. In this embodiment, the fuelling system 21 further comprises a fuel injection system (not shown) having a fuel rail containing a fuel regulator, with the fuel rail being in fluid communication with both the fuel supply circuit 27 and the fuel return circuit 29.

The lubrication system 23 comprises an oil reservoir in the form of an oil tank 31.

Figure 3:
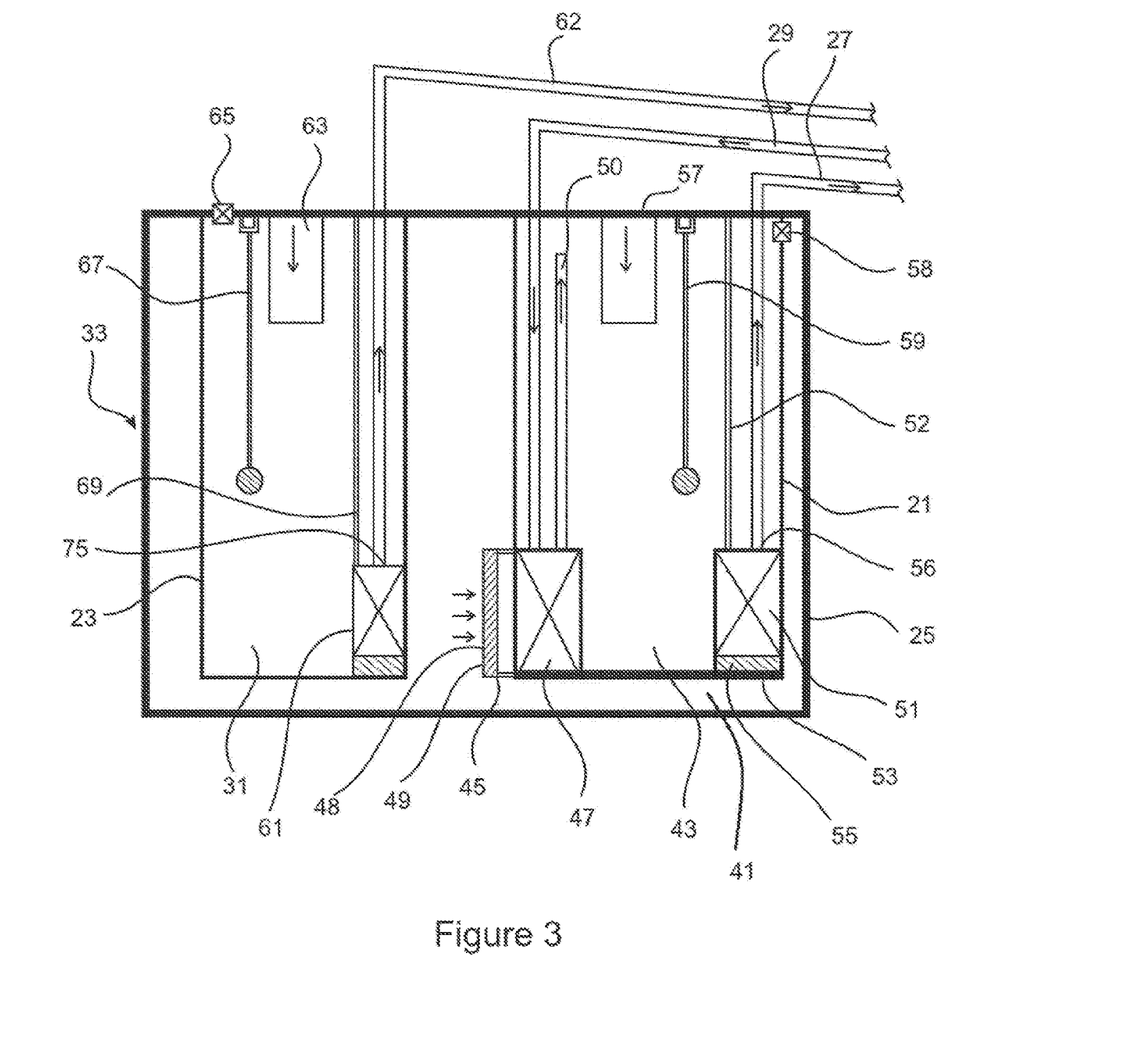
FIG. 3 is a schematic side view of the fuel and lubrication system, illustrating in particular a fuel reservoir from which fuel can be delivered to the engine, and an oil reservoir from which lubricating oil can be delivered to the engine.

The oil tank 31 is accommodated internally within the fuel reservoir 25 to provide an integrated assembly 33, as shown in FIG. 3 and as will be described in more detail later.

The integrated assembly 33 is preferably so positioned within the fuselage 13 with respect to the centre of gravity of the UAV 10 such that variations in fuel mass within the fuel reservoir 25 and oil mass within the oil tank 31 do not cause a significant shift in the position of the centre of gravity and hence do not result in any unwanted moments of inertia for the UAV during flight. The integrated assembly 33 also provides for a compact configuration, which may be beneficial in assisting in the UAV design process. This is the case in this example embodiment where the UAV 10 has size constraints in accommodating the propulsion system 17 within the fuselage 13, particularly in achieving a configuration and layout which satisfies considerations with respect to the centre of gravity and minimising moments of inertia for the UAV.

In the arrangement shown, and as best seen in FIG. 3, the fuel reservoir 25 comprises a main tank 41 and a supplementary tank 43. The supplementary tank 43 will hereinafter be referred to as a header tank. The header tank 43 is accommodated internally within the main tank 41 so as to be surrounded by fuel in the main tank 41. This arrangement is advantageous, as any leakage from the header tank 43 would merely be into the main tank 41 and as such unlikely to be of any adverse consequence.

The oil tank 31 is also accommodated internally within the main tank 41 so as to be surrounded by fuel in the main tank 41. With this arrangement, thermal energy (heat) within fuel contained within the main tank 41 may be transferred to the oil tank 31 for heating (warming) of the oil therein, as will be discussed in more detail later.

The main tank 41, header tank 43 and oil tank 31 are each of a fixed size and volume.

The header tank 43 is arranged to receive fuel from the main tank 41 by way of a transfer system 45 comprising a transfer pump 47. In the arrangement show, the transfer pump 47 comprises a jet pump supplied by return fuel flow from the engine via the fuel return circuit 29. The jet pump 47 has an inlet 48 in communication with the main tank 41 via filter 49. It is, however, to be understood that the jet pump 47 and/or transfer system 45 could in certain arrangements include an inlet comprising multiple pick-up points, with or without filters, through which fuel is drawn into the header tank 43. The jet pump 47 also has a discharge tube 50.

A fuel pump 51 is also accommodated internally within the header tank 43. In the arrangement shown, the fuel pump 51 comprises an electric fuel pump operable under control of the ECU. The electric fuel pump 51 is configured to receive power by way of electrical wires 52. The fuel pump 51 has an intake 53 in communication with the header tank 43 via filter 55. Similarly as above, it should be appreciated that the fuel pump 51 could in certain arrangements include an intake comprising multiple pick-up points, with or without filters, through which fuel is drawn into the fuel pump 51 for delivery therefrom. In the arrangement shown, the filter 55 is a wicking filter of known kind. The fuel pump 51 has a discharge outlet 56 in fluid communication with the fuel supply circuit 27 for transporting fuel from the fuel reservoir 25 to the engine 19.

The header tank 43 has an inlet 57 through which the tank can be filled with fuel as necessary. The header tank 43 also includes a vent 58 for venting the interior of the tank and overflow into the main tank 41 via a one-way valve. It should however be understood that in alternative arrangements, venting of the header tank 43 may be facilitated by way of a suitably arranged orifice instead of a one-way valve. The header tank 43 also has a fuel level switch or sensor 59.

The lubrication system 23 further comprises an oil pump 61 for delivering oil from the oil tank 31 to the engine 19 along oil supply circuit 62.

The oil tank 31 has an inlet 63 through which the tank can be filled with oil as necessary. The oil tank 31 also includes a vent 65 for venting the interior of the tank, and a level switch or sensor 67.

The oil pump 61 comprises an electronic oil pump operable under control of the ECU and configured to receive power by way of electrical wires 69. The electronic oil pump may comprise an electromagnetically-actuated reciprocating-piston pump, and more particularly a solenoid-actuated positive displacement piston pump, which is the case in this embodiment.

Figure 4:
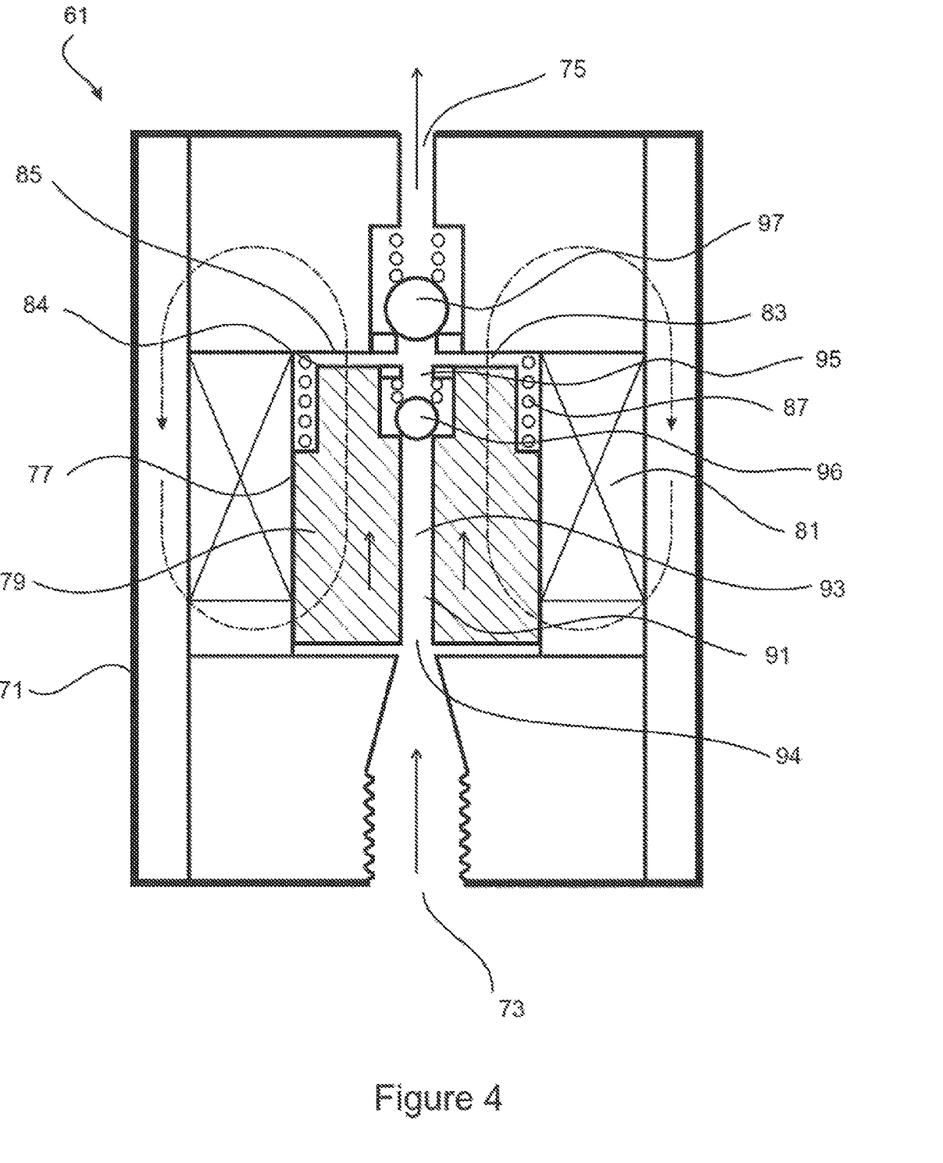
FIG. 4 is a schematic sectional view of an electronic oil pump forming part of the fuel and lubrication system.

In the arrangement shown, and as best seen with reference to FIG. 4, the electronic oil pump 61 comprises a pump body 71 having an inlet 73 and an outlet 75. The pump body 71 defines an internal cavity 77 between the inlet 73 and the outlet 75. An electromagnetic piston 79 is mounted for sliding reciprocating motion within the cavity 77. An electromagnetic coil 81 surrounds the electromagnetic piston 79, thereby providing a solenoid arrangement for electromagnetically operating the piston 79 in known manner.

The piston 79 is movable axially between two end positions within the cavity 77. The two end positions are defined by the opposed ends of the cavity 77 in the axial direction of movement of the piston 79 within the cavity.

The piston 79 cooperates with the cavity 77 to define a pumping chamber 83 of variable volume, with sliding reciprocating motion of the piston within the cavity causing volume expansion and volume contraction of the pumping chamber. More particularly, the pumping chamber 83 is defined between an end 84 of the piston 79 and a confronting end wall 85 of the cavity 77.

A spring 87, which acts between the piston 79 and end wall 85 of the cavity 77, is operable to bias the piston 79 for motion in a first direction. In the arrangement shown, the first direction corresponds to volume expansion of the pumping chamber 83. Specifically, the spring 87 biases the piston 79 into a position corresponding to the maximum volume condition of the pumping chamber 83.

Energisation of the electromagnetic coil 81 under the control of the engine ECU creates a magnetic attractive force to cause movement of the piston 79 in a second direction against the biasing effect of the spring 87, as would be understood by a person skilled in the art. In the arrangement shown, the second direction corresponds to volume contraction of the pumping chamber 83.

In the arrangement described and illustrated, the spring 87 biases the piston 79 into the maximum volume condition and the electromagnetic coil 81 is operable to cause movement of the piston 79 against the biasing effect of the spring 87 to cause volume contraction of the pumping chamber 83. This arrangement could, of course, be reversed, with the spring 87 biasing the piston 79 into the minimum volume condition and the electromagnetic coil 81 being operable to cause movement of the piston 79 against the biasing effect of the spring 87 to cause volume expansion of the pumping chamber 83.

The piston 79 includes a central bore 91 defining a flow path 93 which communicates at one end 94 with inlet 73. The other end 95 of flow path 93 communicates with the pumping chamber 83 via a one-way inlet valve 96 integrated within the piston 79. The one-way inlet valve 96 is configured to permit flow along flow path 93 from the inlet 73 into the pumping chamber 83 and to prevent flow in the reverse direction. With this arrangement, oil can flow through the inlet 73 and into the pumping chamber 83 upon volume expansion of the pumping chamber 83.

The outlet 75 communicates with the pumping chamber 83 via a one-way outlet valve 97. The one-way outlet valve 97 is configured to permit flow from the pumping chamber 83 and to prevent flow in the reverse direction. With this arrangement, oil can be discharged under pressure from within the pumping chamber 83 to the outlet 75 upon volume contraction of the pumping chamber.

The alternating action of the magnetic attractive force produced by intermittent current flowing through the electromagnetic coil 81 under the control of the engine ECU, and the biasing force of spring 87 causes the piston 79 to reciprocate with the cavity 77, thereby causing volume contraction and expansion of the pumping chamber 83 and thus delivery of oil from the inlet 73 to the outlet 75, and more specifically pumping of oil from the pumping chamber 83 through the outlet valve 97 and outlet 75.

Operation of the solenoid actuated positive displacement piston pump 61 may generate additional heat to assist heating (warming) of oil within the oil tank 31, as will be discussed further later.

As alluded to above, there are several sources of heat for heating (warming) the lubrication oil, including heat transfer from the fuel, heat available from operation of the electronic oil pump 61, and heat received from the internal combustion engine 19. Heating of the lubrication oil may be beneficial in certain circumstances; for example, at start-up, and also for a UAV engine likely to experience operation at high altitude conditions or prolonged operation in cold environments.

In relation to heat transfer from fuel, the fuel may accumulate heat from various sources, including for example heat generated by operation of the electronic fuel pump 51 to which the fuel is exposed, and heat from the engine 19. Heat from the engine 19 may be by way of conduction and/or heat transfer through circulation of fuel between the fuel reservoir 25 and the engine via fuel supply circuit 27 (transporting fuel from the fuel reservoir 25 to the engine) and also the fuel return circuit 29 (returning excess fuel to the engine to the fuel reservoir 25). In particular, as the engine 19 becomes hot during normal operation, the fuel rail and associated fuel regulator increase in temperature, transferring heat to return fuel flowing back to the fuel reservoir 25 along fuel return circuit 29. The return fuel, which as a consequence is at an elevated temperature condition, mixes with fuel within the header tank 43 to effect heating of the fuel.

It is believed heating available through heat generated by operation of the electronic fuel pump 51 in this embodiment may be about 7 W. Further, it is believed heating available through recirculation of fuel in this embodiment may be in the order of about 10 to 100 W.

Still further, it is believed that heating available to the oil from the engine may be by way of conduction along an oil delivery line within oil supply circuit 62, and may be in the order of about 1 to 5 W in this embodiment.

Furthermore, it is believed heating available through heat transfer from the electronic oil pump 61 in this embodiment may be about 2 to 3 W.

In relation to heat transfer from the electronic oil pump 61, heat may be generated in several ways through operation of the electronic oil pump.

Firstly, the mere operation of the electronic oil pump 61 will likely generate heat. Specifically, the electromagnetically-actuated piston pump 61 has electromagnetic coil 81 adapted to be energised by an electrical supply, with energisation of the electromagnetic coil generating heat. Additionally, heat will also likely be generated through frictional effects upon movement of the piston 79 within the pump 61.

Secondly, the electromagnetically-actuated piston pump 61 may be operated according to a control strategy to provide additional heat. By way of example, over-energisation of the electromagnetic coil 81 can be used to heat the oil pump 61 and consequently heat the oil surrounding the pump. In other words, the electromagnetic coil 81 can be energised for a time period longer than the stroke period of the pump 61, whereby the additional energy, which cannot induce further movement of the piston 79 because the piston is at the end of its stroke, is dissipated as heat. Put another way, the electromagnetic coil 81 is energised for a period of time to cause heating of the oil without continuously pumping the oil. In this way, the electromagnetically-actuated piston pump 61 is selectively operable to generate additional heat to assist heating (warming) of oil without pumping of any additional oil.

The electronic oil pump 61 may be controlled by the engine ECU, with the ECU being operable to vary the energisation period of the electromagnetic coil 81 to effect a lubrication oil heating strategy.

It is believed heating available through heat transfer from the electronic oil pump 61 in this embodiment may be about 2 to 3 W.

From the foregoing, it is evident that the present example embodiment provides unmanned aerial vehicle (UAV) 10 having the capacity to heat (warm) lubrication oil required for the UAV engine, using heat sources onboard the UAV. This heating can be accomplished relatively rapidly, using the various available heat sources as described, and in particular through adoption of a lubrication oil heating strategy involving operation of the electromagnetically-actuated piston pump in a manner to vary the energisation period of the electromagnetic coil to generate additional heat.

This can be beneficial in circumstances where the UAV may be required to undergo missions likely to encounter high altitude conditions or likely to involve prolonged operation in cold environments.

Further, the present example embodiment provides unmanned aerial vehicle (UAV) 10 having the propulsion system 15 accommodated in a configuration and layout which satisfies considerations with respect to the centre of gravity so as to minimise or negate any undesirable moments of inertia for the UAV. In particular, the oil tank 31 accommodated internally within the fuel reservoir 25 provides integrated assembly 33 which can be so positioned within the airframe 11 with respect to the centre of gravity of the UAV such that variations in fuel mass within the fuel reservoir 25 and oil mass within the oil tank 31 do not cause a significant shift in the position of the centre of gravity, hence avoiding the generation of unwanted moments of inertia for the UAV during flight. The integrated assembly 33 also provides for a compact configuration, which may be beneficial in assisting in the UAV design process. This is the case in the example embodiment where the UAV 10 has size constraints in accommodating the propulsion system 17 within the fuselage 13, particularly in achieving a configuration and layout which satisfies considerations with respect to the centre of gravity and minimising moments of inertia for the UAV.

In the example embodiment described, heating (warming) of lubrication oil required for the UAV engine involved use of the various available heat sources as described. It should be appreciated that in other embodiments only one or more, and not necessarily all, of the heat sources described may be used. Further, in other embodiments there may be one or more auxiliary heating sources provided to assist in heating (warming) of lubrication oil required for the UAV engine. By way of example, there may be one or more heating devices, such as dedicated heater elements, operable to assist in heating (warming) of lubrication oil. The auxiliary heating sources may have temperature control systems, although this need not necessarily be so.

Modifications and improvements may be made without departing from the scope of the invention. In particular, while the present invention has been described in terms of a preferred embodiment in order to facilitate better understanding of the invention, it should be appreciated that various modifications can be made without departing from the principles of the invention. Therefore, the invention should be understood to include all such modifications within its scope.

Reference to positional descriptions, such as "lower", "upper", "top" and "bottom" are to be taken in context of the embodiment depicted in the drawings, and are not to be taken as limiting the invention to the literal interpretation of the term but rather as would be understood by the skilled addressee.

Additionally, where the terms "system", "device", "apparatus" are used in the context of the invention, they are to be understood as including reference to any group of functionally related or interacting, interrelated, interdependent or associated components or elements that may be located in proximity to, separate from, integrated with, or discrete from, each other.

The invention described herein includes a range of preferred heat energy values presented in Watts (W) in relation to heat available for heating (warming) the lubrication oil. It should be understood that the heat energy values are provided for indicative purposes only and that the invention is in no way to be considered to be limited to such values. All heat energy values which achieve the same or substantially the same outcomes are to be considered to be within the scope of the invention.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A fuel and lubrication system comprising a fuel reservoir, an oil reservoir, and an oil pump for delivery of oil from the oil reservoir to an engine, wherein the oil reservoir is accommodated internally within the fuel reservoir, wherein the oil pump comprises an electronic oil pump accommodated within the oil reservoir, and wherein the fuel reservoir comprises a main tank and a supplementary tank which can receive fuel from the main tank and from which fuel can be delivered to an engine.

2. The fuel and lubrication system according to claim 1, wherein the oil reservoir is accommodated internally within the main tank of the fuel reservoir.

3. The fuel and lubrication system according to claim 1, wherein the supplementary tank is associated with the main tank, whereby the main tank and the supplementary tank cooperate to provide the fuel reservoir.

4. The fuel and lubrication system according to claim 3, wherein the supplementary tank is accommodated within or closely adjacent to the main tank.

5. The fuel and lubrication system according to claim 4, wherein the supplementary tank is accommodated internally within the main tank.

6. The fuel and lubrication system according to claim 1, further comprising a transfer system for transferring fuel within the fuel reservoir from the main tank to the supplementary tank.

7. The fuel and lubrication system according to claim 6, wherein the transfer system comprises a transfer pump.

8. The fuel and lubrication system according to claim 7, wherein the transfer pump comprises a jet pump supplied by return fuel flow from the engine to the fuel reservoir.

9. The fuel and lubrication system according to claim 1, wherein the oil reservoir comprises an oil tank accommodated internally within the main tank of the fuel reservoir.

10. The fuel and lubrication system according to claim 1, wherein the electronic oil pump comprises an electromagnetically-actuated pump.

11. The fuel and lubrication system according to claim 10, wherein the electromagnetically-actuated pump comprises an electromagnetically-actuated reciprocating-piston pump.

12. The fuel and lubrication system according to claim 11, wherein the electromagnetically-actuated reciprocating-piston pump comprises a solenoid actuated positive displacement pump.

13. The fuel and lubrication system according to claim 1, wherein the electronic oil pump is operable to generate additional heat to assist heating (warming) of oil without pumping of any additional oil.

14. A vehicle having a fuel and lubrication system according to claim 1.

15. The vehicle according to claim 14, further comprising an internal combustion engine operable using fuel and lubricating oil received from the fuel and lubrication system.

16. The vehicle according to claim 14, wherein the vehicle is selected from a group consisting of an unmanned aerial vehicle (UAV), another type of aerial vehicle or aerial craft, a watercraft, and a ground-based vehicle including for a snowmobile.

17. A vehicle engine system comprising an internal combustion engine, a fuel system for fuelling the engine, and a lubrication system for delivering lubrication oil to the engine, the fuel system comprising a fuel reservoir, the lubrication system comprising an oil reservoir and an oil pump for delivery of oil from the oil reservoir to the engine, wherein the oil reservoir is accommodated internally within the fuel reservoir, wherein the oil reservoir is accommodated within the fuel reservoir, and wherein the fuel reservoir comprises a main tank and a supplementary tank which can receive fuel from the main tank and from which fuel can be delivered to the engine.

18. The vehicle engine system according to claim 17, wherein the electronic oil pump is operable to generate additional heat to assist heating of oil without pumping of any additional oil.

19. A vehicle having a vehicle engine system according to claim 17.

20. An unmanned aerial vehicle (UAV) comprising:
an airframe; and
a propulsion system including an internal combustion engine, a fuel reservoir from which fuel can be delivered to the engine, and an oil reservoir from which lubricating oil can be delivered to the engine;
wherein the lubrication system comprises an oil reservoir and an oil pump for delivery of oil from the oil reservoir to the engine;
wherein the oil reservoir is accommodated internally within the fuel reservoir to provide an integrated assembly;
wherein the oil pump comprises an electronic oil pump accommodated within the oil reservoir; and
wherein the fuel reservoir comprises a main tank and a supplementary tank which can receive fuel from the main tank and from which fuel can be delivered to an engine.

* * * * *